Aug. 19, 1930.  M. J. CLARK  1,773,093
CONNECTING ROD
Filed Aug. 8, 1927
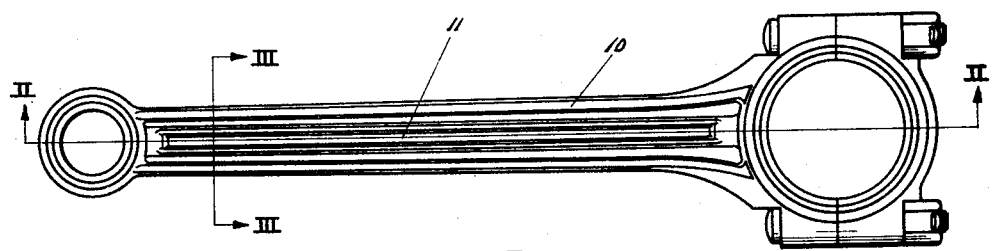
Fig. I.
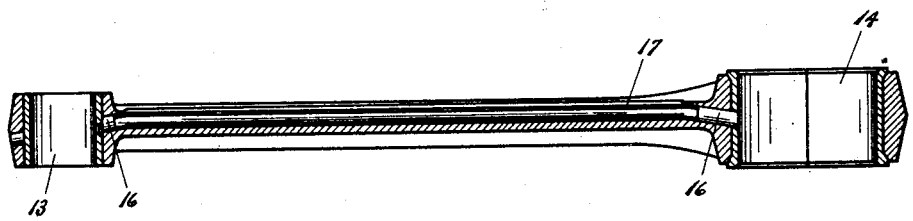
Fig. II.
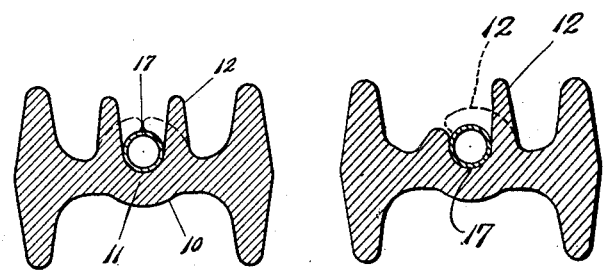
Fig. III.  Fig. IV.
INVENTOR.
MAX J. CLARK
BY Chester H. Braselton
ATTORNEY.

Patented Aug. 19, 1930

1,773,093

UNITED STATES PATENT OFFICE

MAX J. CLARK, OF PONTIAC, MICHIGAN, ASSIGNOR TO THE WILLYS-OVERLAND COMPANY, OF TOLEDO, OHIO, A CORPORATION OF OHIO

CONNECTING ROD

Application filed August 8, 1927. Serial No. 211,308.

My invention relates to the manufacture of metallic elements having conduits therein, and it has particular application to the fabrication of connecting rods for internal combustion engines which are formed with oil passages interconnecting the wrist pin and crankshaft bosses.

It has been suggested that hollow connecting rods be manufactured without the conventional drilling operation by forging the rod to include one or more flanged portions which are disposed adjacent a recessed portion, and subsequently bending over the flanged portion and sealing the line of contact without filling up the recessed portion. Holes are drilled through the boss portions to connect the bearing surface with the conduit along the shank of the rod thus formed. As an alternative of the above method of manufacture, it has been suggested that the recess be formed by a suitable milling operation.

Certain difficulties are experienced in the manufacture of rods according to the method aforementioned. Thus it has been found that the comparatively deep recess approximately disposed with respect to the flanged portions, weakens the dies materially resulting in their frequent breakage. This undesirable feature, as well as others, are overcome by the present invention, according to which the relative height and depth of the flanged and recessed portions respectively may be reduced.

One object of the invention is to provide a connecting rod structure which may be manufactured with but a minimum of milling.

It is a further object of this invention to provide a connecting rod structure in which a tubular means may be readily and firmly secured along the shank portion of the rod.

Another object of the invention is to provide a connecting rod having an oil communicating duct extending between the boss portions, in which the brazing and drilling operations are materially reduced.

It is a further object of the invention to provide a connecting rod having an oil communicating passage extending between the boss portions formed by adjacent recessed and flanged portions, and having means for preserving and reinforcing the passage thereby insuring an unobstructed conduit for the passage of the lubricating fluid. These together with other objects, will become more apparent from a consideration of the drawings which illustrate one form of a preferred embodiment of the principles of the invention.

Figure I is a plan view of a connecting rod before the duct is disposed within the forged recessed portion.

Fig. II is a sectional view, substantially along the line II—II of Fig. I, of a rod in which the tube and oil communicating passages are assembled in operative relation.

Fig. III is a sectional view of a connecting rod taken along a line corresponding to line III—III in Fig. I, in which the interconnecting tube is disposed in its final position and likewise illustrates the relation of the flanged portions with respect to the tube in their final position, and Fig. IV is a sectional view corresponding to that illustrated in Figure III of the modification of the embodiment illustrated in the first three figures.

In practicing the present invention the connecting rod is forged after the manner of the conventional rod, differing only in that the shank is provided with a comparatively deep recessed portion immediately adjacent a comparatively high flanged portion. Thus in the drawings there is illustrated a shank portion 10 having a recess 11 disposed between two symmetrical flanged portions 12. A wrist pin boss 13 and a crankshaft boss 14 are formed integrally with the ends of the shank and are provided with drilled holes 16 which interconnect the bearing surfaces with the recess of the shank.

Following the drilling operation, a tube 17 or a suitable reinforcing means is disposed within the recess and connected with the oil holes in the boss. Subsequently, the adjoining surfaces in the boss members may be brazed after which the extended flanges are bent about the tubular reinforcing means in the manner illustrated in Fig. III. If it is desired, a single flange 12 of somewhat greater height may be formed to enclose completely about the exposed surface of the tube, joining the shank on the opposite sides of the recess.

It is unnecessary to provide flanges which enclose about the tube completely. By reason of this fact, the dies which are employed in manufacturing the rod are less susceptible to breakage. At the same time the tube will be held securely in the rod and communication between the two bearing surfaces will remain uninterrupted. The present invention also affords a construction requiring less brazing than is necessary in the unreinforced rod, inasmuch as the connections between the tubular means and the bosses alone require a seal, particularly if the reinforcing means is of a closed tubular construction.

Although there is illustrated but a single embodiment of the principles of my invention, it will be apparent to those skilled in the art from the description thereof, that they are not limited to the specific embodiment disclosed, but may be applied to many widely different embodiments, and I desire therefore that the invention be limited only as indicated by the prior art and the appended claims.

I claim:

1. A connecting rod for internal combustion engines comprising a longitudinal recessed shank having an adjoining flange extending over the recess, a wrist pin boss and a crank shaft boss, each having oil passages therein and each formed integrally with the ends of the shank, a conduit disposed within said recess and secured therein by said flange, said conduit interconnecting the oil passages in the bosses.

2. A connecting rod for internal combustion engines comprising a shank having wrist pin and crank shaft bosses on the ends thereof, a tube positioned along said shank adapted to convey fluid from one end of the rod to the other, and a longitudinal flange on said shank extending around a portion of the surface of said tube to permanently secure the same to said shank.

3. A connecting rod for internal combustion engines comprising a shank having bearing bosses on the ends thereof, a longitudinal recess in said shank, a tube within said recess adapted to convey fluid from one end of the shank to the other, and flanges on said shank on opposite sides of said recess and extending over said tube to secure the same in said recess.

4. A connecting rod for internal combustion engines comprising a shank having bearing bosses on the ends thereof, a longitudinal recess in said shank having a flange on each side thereof, the extremities of said flange being positioned closely adjacent each other to substantially close said recess, and means within said recess forming a seal between the extremities of said flanges.

5. A connecting rod for internal combustion engines comprising a shank having bearing bosses on the ends thereof, longitudinal flanges on said shank having their extremities positioned closely adjacent each other to form a substantially closed passage between said flanges and said shank, and means disposed within said passage forming a seal between the extremities of said flanges.

6. A connecting rod for internal combustion engines comprising a shank having bearing bosses on the ends thereof, a tube positioned along said shank and communicating with said bosses, and flanges on said shank on opposite sides of said tube, said flanges extending around said tube to secure the same to said shank.

In testimony whereof I affix my signature.

MAX J. CLARK.